Mar. 6, 1923.
R. D. HELLER
SEED SCREEN
Filed May 17, 1920
1,447,660
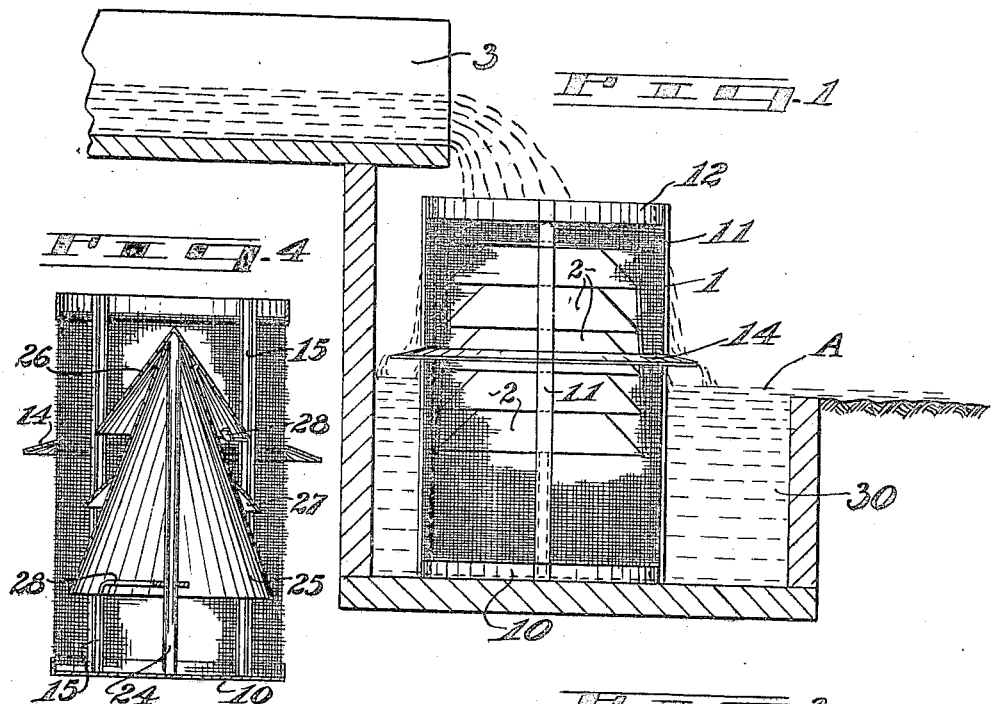
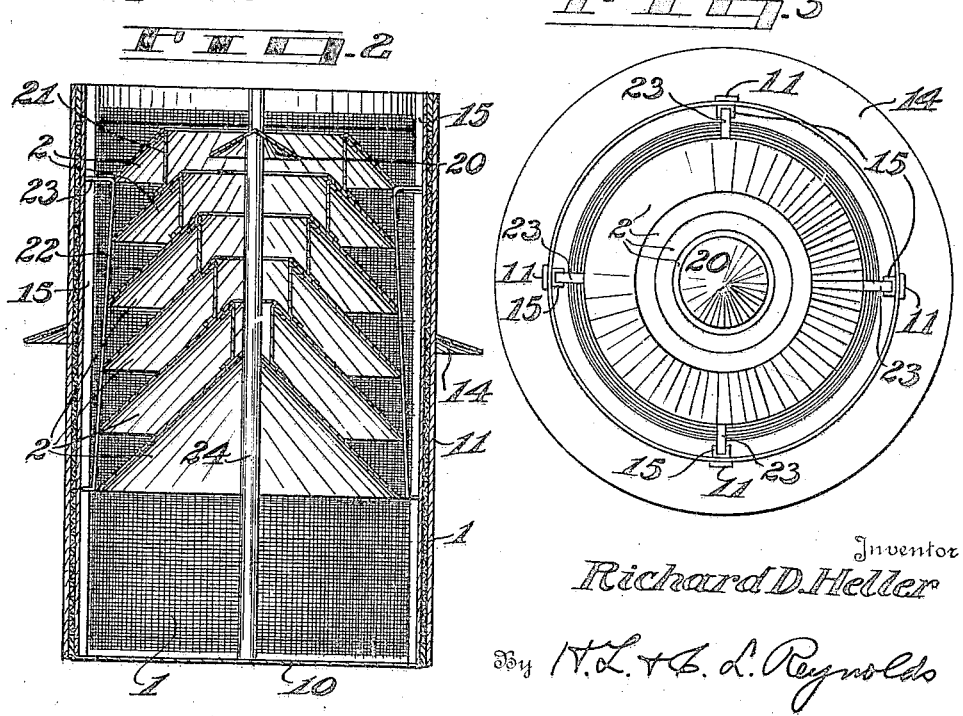
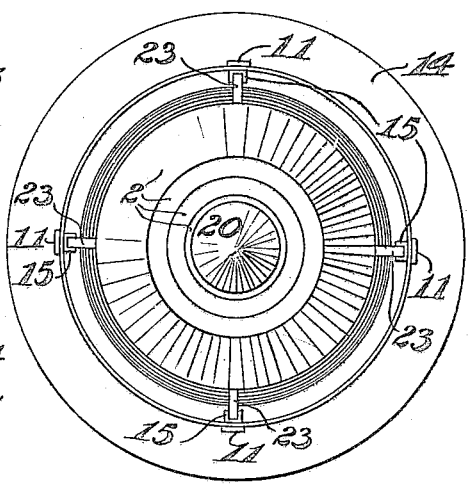
Inventor
Richard D. Heller
By V. L. & C. L. Reynolds
Attorneys Patented Mar. 6, 1923.

1,447,660

UNITED STATES PATENT OFFICE.

RICHARD D. HELLER, OF BOISE, IDAHO.

SEED SCREEN.

Application filed May 17, 1920. Serial No. 382,189.

*To all whom it may concern:*

Be it known that I, RICHARD D. HELLER, a citizen of the United States, and resident of the city of Boise, in the county of Ada and State of Idaho, have invented certain new and useful Improvements in Seed Screens, of which the following is a specification.

My invention relates to an improvement in seed strainers.

An object of my invention is to provide improved apparatus for removing the seeds of weeds and other undesirable small débris from the water which is employed in irrigation.

Another object of my invention is to provide a strainer of the type described which will be highly efficient and rapid in operation, though constructed of fine mesh, and easily cleansed.

My invention comprises those novel parts and combinations thereof which are shown in the accompanying drawings, described in the specification, and particularly defined by the claims terminating the same.

In the accompanying drawings, wherein I have shown my invention in certain forms which are now preferred by me, Figure 1 is an elevation of my device showing it as it would appear in operation.

Figure 2 is a section through my device.

Figure 3 is a plan view.

Figure 4 is a section of a modified construction.

In irrigation considerable difficulty is experienced in removing the seeds of weeds and other small undesirable débris from the irrigation water. They are carried in suspension or float in the irrigation ditches and in this manner are spread broadcast over fields where they are not only undesirable but in most cases harmful. My invention aims to produce a device which will efficiently and surely remove such matter from the water before it passes out of the confines of the ditches onto the land.

The strainer proper consists of a bucket 1 of mesh material sufficiently fine to retain the smallest weed seeds. This is provided with a suitable bottom 10 of either mesh or solid material. The bucket is supported by frame members 11 connected at their upper ends by a link 12. Any suitable construction may be employed for the bucket which provides a large straining surface at its sides.

I may provide one or more deflectors in the form of collars 14 which fit about the bucket and which lie closely against its outer wall. I prefer that they be sloped downward slightly to permit the water to drain off easily. As the water passes through the bucket 1 and flows down upon these collars it is deflected outward, thus permitting more water to pass through the bucket and preventing the water from running down the side of the bucket until it reaches the water level, indicated by A in Figure 1.

Within the bucket I employ spreaders or baffles to direct the water outward against the sides and to divert the force of whatever fall of water there may be radially, in order that it may more rapidly force the water outward. My preferred form of these baffles is shown in Figures 1, 2, and 3. These consist of a series of round or conical shells 2 which are vertically spaced one above the other and which are spaced at their edges from the inner wall of the bucket 1.

I prefer that all of these shells 2 except the lowermost shall have its central portion, or its apex, cut away in order that portions of the water may pass through the openings thus remaining. Preferably each cone is truncated to a slightly greater degree than the one below it, and thus the minor diameter of each shell 2 is greater than the minor diameter of the one below it. In order that the edges of each of the shells 2 may have its influence upon the water as it passes down the sides the uppermost baffles 2 are spaced away from the walls of the bucket 1 slightly more than the lower baffles. I may employ a small radially directed baffle of conical shape, as shown at 20, positioned at the top of the series of baffles 2, at about the level of the uppermost baffle. This is centrally positioned within the series and receives the greater volume of water as it flows from an upper ditch 3 into a lower ditch 30, and deflects the water outwardly into the various baffles 2. This should be sufficiently lower than the upper edge of the bucket to prevent water or seeds splashing over the edge.

The whole series of baffles 2 and 20 may be formed as a single unit, in which case spacer rods 21 may be employed to space the inner edges of the cones 2, and their outer edges may be secured together by rods 22. In order to remove the series of baffles conveniently, the ends of the rod 22 may be turned inward to form the followers 23 which will slide in suitable guides, as the channels 15. These channels are vertically positioned inside the bucket 1, and may be placed opposite the frame members 11 of the bucket, and will cooperate therewith to support the mesh 1 and to keep it in proper upright position. A central rod 24 may also be employed to secure together the series of baffles 2 and the baffle 20, and this rod may extend downward to contact with the bottom 10 of the bucket and to support the series of baffles at the proper elevation within the bucket.

The modified form shown in Figure 4 is in many respects similar to the form shown in the other figures excepting that the cones have not their apices cut away. The conical baffle 25 forms the foundation of this series and upon its upper end is secured the conical baffle 26, corresponding to the upper baffle 20 described above. One or more intermediate baffles of truncated conical shape, as shown at 27, may be secured upon the cone 25 to act similarly to the intermediate baffles of the preferred form. This series of baffles is supported upon a rod 24, and may be guided in the channels 15 in any suitable manner, as by the followers 28.

My strainer is positioned within an irrigation system where there is a slight drop from a flume 3 to a ditch 30. The flume discharges its contents into the center of the bucket and deflectors 20 and 2 direct the water outwardly against the mesh of the bucket with more or less force. The water passes through the mesh and as it runs down the outside of the bucket is deflected outwardly and runs off at the edges of the collars 14. The seeds and other débris contained in the water are washed down the inside of the bucket and are deposited in its bottom. At suitable intervals the series of baffles is removed and the bucket is emptied and then replaced. By this means all of the objectionable matter is removed from the irrigation water and not distributed through the ditches.

It will be evident that a bucket or strainer of this type might be found useful for other purposes than for removing seeds from an irrigation water. One use to which it might be put, on account of the possibility of using fine mesh material in its construction is for straining milk. This is quite a serious problem under the present conditions and such a strainer as the one described above might be advantageously employed for such purposes.

What I claim as my invention is:

1. A seed screen comprising a strainer bucket, and a series of baffles therein for directing a liquid moving through the bucket outwardly through its walls.

2. A seed screen comprising a strainer bucket, and a series of vertically-disposed, baffles therein, for directing a liquid moving downwardly through the bucket radially outward through its walls, said baffles being spaced at their edges from the wall of the bucket, and the edges of the upper baffles being spaced farther therefrom than the edges of the lower baffles.

3. A seed screen comprising a strainer bucket, and a series of radial, outwardly and downwardly directed baffles removably mounted therein, said baffles being adjacent to and spaced from the strainer walls of the bucket.

4. A seed screen comprising a strainer bucket, means for directing water entering the bucket against its inner walls, and a collar surrounding said bucket and being in close contact with its side walls.

5. A seed screen comprising a strainer bucket, a series of vertically-disposed, radially-directed baffles therein, and a collar surrounding said bucket above the normal water level and being in close contact with its side walls.

6. A seed screen comprising a strainer bucket, vertical guides within said bucket, and a series of radially-directed baffles removably mounted upon said guides.

7. A seed screen comprising a strainer bucket, vertical guides within said bucket, and a series of vertically-disposed, radially-directed baffles removably mounted upon said guides and having their edges spaced from the side walls of the bucket.

8. A seed screen comprising a strainer bucket open at its top to receive a liquid to be strained, and a series of conical baffles therein having their apices uppermost.

9. A seed screen comprising a strainer bucket, a series of vertically-disposed conical shells forming baffles therein and having their apices uppermost, the baffles above the lowermost one being truncated, and a small conical baffle axially-positioned at the level of the uppermost of said series of baffles.

10. A seed screen comprising a strainer bucket, a series of vertically spaced conical shells forming baffles therein and having their apices uppermost, the baffles above the lowermost one being truncated and each having a larger minor diameter and a smaller major diameter than the one next below it, and a small radially-directed baffle centrally-positioned at the level of the uppermost of said series of baffles.

11. A seed screen comprising a strainer bucket and a series of radially-directed baffles spaced one above the other in said bucket, all of said baffles except the lowermost one having their centers removed, and said central opening in each baffle being less in area than the one next above it.

Signed at Seattle, King County, Washington.

RICHARD D. HELLER,